US011040647B2

(12) United States Patent
Nagai et al.

(10) Patent No.: US 11,040,647 B2
(45) Date of Patent: Jun. 22, 2021

(54) VEHICLE SEAT

(71) Applicant: Toyota Jidosha Kabushiki Kaisha, Toyota (JP)

(72) Inventors: Tetsuya Nagai, Okazaki (JP); Kohshi Katoh, Toyota (JP); Koki Kunugi, Fuji (JP); Ryunosuke Seki, Shizuoka (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/857,898

(22) Filed: Apr. 24, 2020

(65) Prior Publication Data

US 2020/0353854 A1    Nov. 12, 2020

(30) Foreign Application Priority Data

May 8, 2019    (JP) .............................. JP2019-088106

(51) Int. Cl.
| | |
|---|---|
| *B60N 2/888* | (2018.01) |
| *B60N 2/809* | (2018.01) |
| *B60N 2/853* | (2018.01) |
| *B60N 2/68* | (2006.01) |
| *B60N 2/70* | (2006.01) |

(52) U.S. Cl.
CPC .............. *B60N 2/888* (2018.02); *B60N 2/68* (2013.01); *B60N 2/7094* (2013.01); *B60N 2/809* (2018.02); *B60N 2/853* (2018.02)

(58) Field of Classification Search
CPC ..................................................... B60N 2/888
See application file for complete search history.

(56) References Cited

U.S. PATENT DOCUMENTS

| | | | | |
|---|---|---|---|---|
| 6,783,177 | B1* | 8/2004 | Nakano ................. | B60N 2/818 297/216.12 |
| 7,374,239 | B1* | 5/2008 | Jayasuriya ............. | B60N 2/838 297/216.12 |
| 7,905,545 | B2* | 3/2011 | Andersson ........... | B60N 2/0232 297/217.3 |
| 10,239,421 | B2* | 3/2019 | Katoh .................. | B60N 2/7094 |
| 2002/0050729 | A1* | 5/2002 | Nakano ................. | B60N 2/838 297/216.12 |
| 2004/0245813 | A1* | 12/2004 | Steffens, Jr. ....... | B60N 2/42781 297/216.1 |
| 2004/0245833 | A1* | 12/2004 | Svantesson ............ | B60N 2/853 297/408 |
| 2006/0103189 | A1* | 5/2006 | Humer ................. | B60N 2/4228 297/216.13 |

(Continued)

FOREIGN PATENT DOCUMENTS

| | | |
|---|---|---|
| JP | 2010-100197 A | 5/2010 |
| JP | 2015-160457 A | 9/2015 |

*Primary Examiner* — Timothy J Brindley
(74) *Attorney, Agent, or Firm* — Dinsmore & Shohl LLP

(57) ABSTRACT

A headrest is supported by an upper lateral member and a lower lateral member of a seat frame. A headrest stay is inserted through each of guide slots, both of which are formed in both the upper lateral member and the lower lateral member, and an extension wire is hooked on a lower end of the headrest stay. In a rear-collision, a seat back is retreated by a force received from a seated passenger, and a tension of the tension wire is accordingly loosened, which causes the headrest to be tilted forward by an urging force of tilt springs.

5 Claims, 7 Drawing Sheets

(56) References Cited

U.S. PATENT DOCUMENTS

| | | | |
|---|---|---|---|
| 2006/0255632 A1* | 11/2006 | Sugimoto | B60N 2/888 297/216.12 |
| 2006/0273636 A1* | 12/2006 | Sugimoto | B60N 2/42727 297/216.12 |
| 2008/0217971 A1* | 9/2008 | Paluch | B60N 2/809 297/216.12 |
| 2009/0179468 A1* | 7/2009 | Orzelski | B60N 2/42781 297/216.12 |
| 2010/0237676 A1* | 9/2010 | Orzelski | B60N 2/888 297/408 |
| 2011/0121622 A1* | 5/2011 | Okimura | B60N 2/888 297/216.12 |
| 2012/0032480 A1* | 2/2012 | Orzelski | B60N 2/818 297/216.12 |
| 2013/0127215 A1* | 5/2013 | Dumont | B60N 2/809 297/217.3 |
| 2014/0132048 A1* | 5/2014 | Takayama | B60N 2/4228 297/216.12 |
| 2015/0239381 A1 | 8/2015 | Hamabe et al. | |
| 2015/0367756 A1* | 12/2015 | Katoh | B60N 2/66 297/285 |
| 2018/0141475 A1* | 5/2018 | Niitsuma | B60N 2/4207 |

\* cited by examiner

VEHICLE SEAT

CROSS REFERENCE TO RELATED APPLICATION

This application claims priority to Japanese Patent Application No. 2019-088106 filed on May 8, 2019, which is incorporated herein by reference in its entirety including the specification, claims, drawings, and abstract.

TECHNICAL FIELD

The present disclosure relates to a vehicle seat, and, in particular, to a headrest.

BACKGROUND

Active headrest devices have been known which move a headrest toward the head of a seated passenger at the instance of a rear-end collision of a vehicle in order to bring the headrest into contact with the seated passenger at an early stage. JP 2010-100197 A discloses an apparatus which uses explosion power of an explosive (54) for releasing a lock of a lock mechanism (R) in a rear-end collision in order to move a support plate (24) toward the head of a seated passenger. It should be noted that the above reference characters within parentheses are identical to those described in JP 2010-100197 A and do not correspond to reference characters that are used for explaining embodiments of this disclosure.

Typically, active headrest devices utilizing the explosive cannot be reused once the devices are activated. The present disclosure facilitates reuse of an active headrest device.

SUMMARY

In an aspect, a vehicle seat according to the present disclosure includes a seat frame, a seat back having a rear surface disc disposed on a rear surface of the seat back, a plurality of tension wires arranged under tension extending between the seat frame and the rear surface disc, a headrest disposed on the seat frame and configured to be tiltable toward the front, and an elastic element configured to urge the headrest to be tilted forward. Some of the plurality of tension wires hooked in the rear surface disc are looped over the headrest to apply a tension to the headrest, the tension maintaining the headrest at an erected position against an urging force of the elastic element during normal operation. In a rear-end collision, the tension is loosened in response to a retreat of the rear surface disc, to thereby cause the headrest to be tilted forward.

The headrest may include a headrest main body which is configured to receive the head of a seated passenger, and a pair of headrest stays which extend downward from the headrest main body and have lower end portions on which the some of the plurality of tension wires are hooked. In addition, the seat frame may include an upper lateral member and a lower lateral member which are disposed on an upper portion of the seat frame so as to be spaced from each other in a vertical direction, and extend along a lateral direction. Each of the upper and lower lateral members includes a pair of guide slots which are long in a front and back direction. The headrest stays are respectively inserted through the guide slots, so that forward and rearward movements of the headrest stays are guided by the guide slots.

The guide slots formed in at least one of the upper lateral member and the lower lateral member have a length that is adjustable in the front and back direction. When the length of the guide slots is changed, a forward tilting angle of the headrest can be changed accordingly.

The elastic element may be placed in each of spaces between the upper lateral member and the headrest stays and between the lower lateral member and the headrest stays, and an installation height of at least one of the upper lateral member and the lower lateral member may be configured to be adjustable. A distance between the upper lateral member and the lower lateral member, which are equipped with the elastic members, can be changed, to thereby change a moment applied to the headrests by the elastic elements.

The seat back may be supported on the seat frame through the plurality of tension wires in a state swingable about the rear surface disc.

Because the headrest is configured to be tilted forward when a tension of the tension wires hooked on the headrest is loosened in a rear-end collision, the vehicle seat can be reused by rearranging the tension wires after the rear-end collision.

BRIEF DESCRIPTION OF DRAWINGS

Embodiments of the present disclosure will be described based on the following figures, wherein.

DESCRIPTION OF EMBODIMENTS

Figure 1:
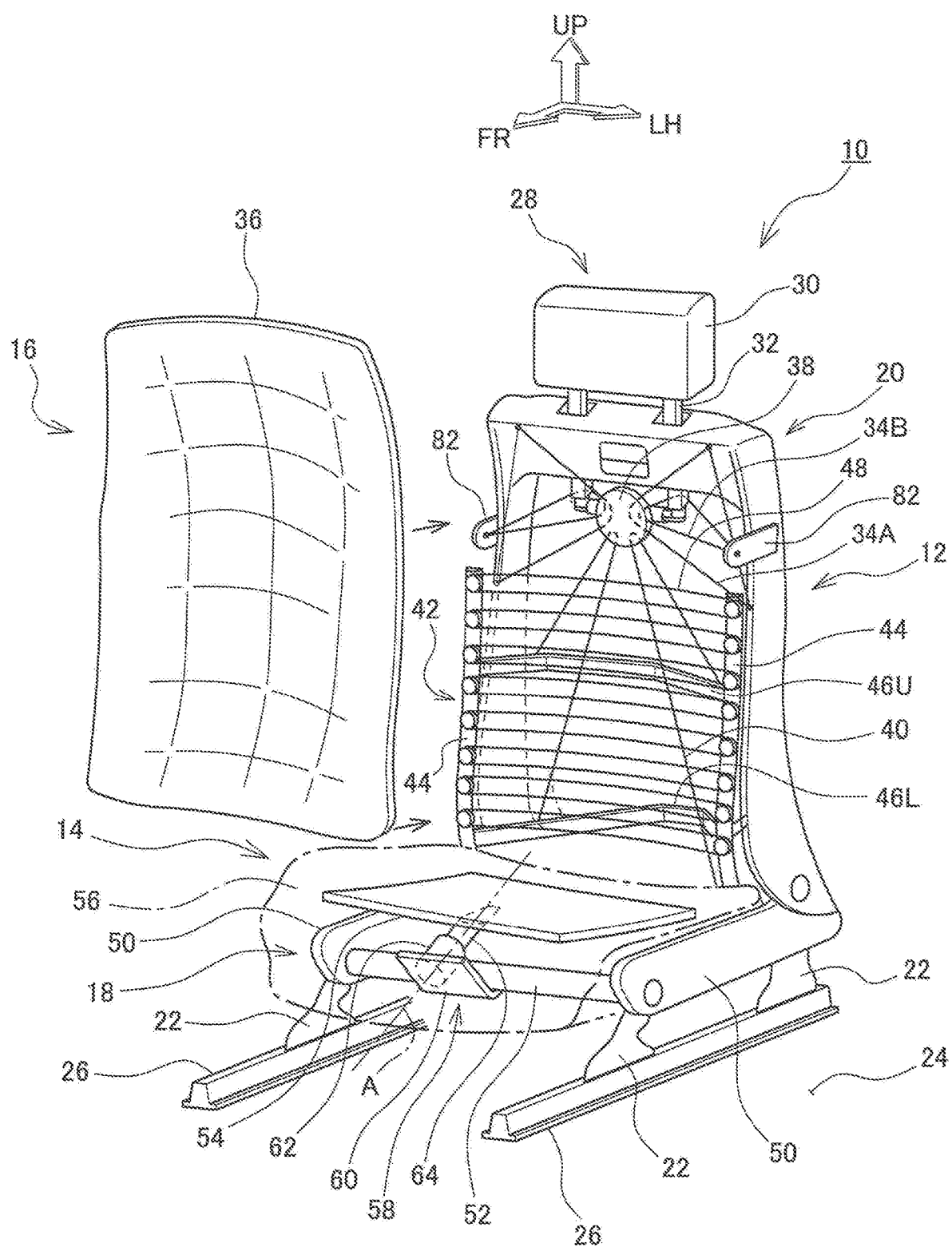
FIG. 1 is a perspective view showing a vehicle seat according to an embodiment.

Hereinafter, a vehicle seat 10 according to an embodiment of this disclosure will be described with reference to the drawings. In the description below, unless otherwise specified, the terms representing relative positional relationships, directions, and orientations, such as front, forward, rear, rearward, left, right, side, above, upward, below, and downward, denote the positional relationships, directions, and orientations with respect to a passenger seated on the vehicle seat 10 (hereinafter, referred to as a "seated passenger"). In the drawings, a direction indicated by an arrow FR is a forward direction, a direction indicated by an arrow UP is an upward direction, and a direction indicated by an arrow LH is a left direction.

FIG. 1 is a perspective view schematically showing a general structure of the vehicle seat 10 as viewed downward from a forward left side. In FIG. 1, some of components are removed. The vehicle seat 10 is a seat employed in a motor vehicle, such as an automobile. The vehicle seat 10 includes a seat frame 12 mounted on a vehicle body, as well as a seat cushion 14 and a seat back 16 which are movably supported by the seat frame 12. In FIG. 1, the seat cushion 14 is illustrated in a transparent form with a phantom line to indicate components within the seat cushion 14. The seat cushion 14 is configured to support the buttocks and thighs of a passenger from below the passenger, while the seat back 16 is configured to support the upper body of the passenger from behind the passenger.

The seat frame 12 includes a seat cushion support frame 18 for supporting the seat cushion 14 and a seat back support frame 20 for supporting the seat back 16. The seat cushion support frame 18 has seat legs 22 at four corners of a lower portion of the seat cushion support frame 18. The seat legs 22 are slidably engaged with a pair of seat tracks 26 which are fixed onto a floor 24 of a vehicle while extending along a front and back direction. In this way, the vehicle seat 10 is mounted on the floor 24 in a state slidable along the front and back direction. The seat back support frame 20 has an inverted U shape when viewed from the front, and lower end portions of the seat back support frame 20 are joined to rear end portions of the seat cushion support frame 18. The seat back support frame 20 is joined to the seat cushion support frame 18 in a state rotatable about an axis extending along a lateral direction. A tilt of the seat back 16 can be adjusted by rotating the seat back support frame 20 relative to the seat cushion support frame 18.

A headrest 28 is placed on an upper portion of the seat back support frame 20 and configured to be able to support the head of a seated passenger from behind the passenger. The headrest 28 includes a headrest main body 30 configured to receive the head of the seated passenger, and a pair of right and left headrest stays 32 which are extended downward from the headrest main body 30 and supported by the seat back support frame 20. An arrangement for supporting the headrest 28 will be described in detail further below.

The seat back 16 is supported on the seat back support frame 20 through tension wires 34A and 34B. Both one tension wire 34A and one tension wire 34B are arranged for each of the right and the left sides of the seat back support frame 20. The seat back 16 includes a seat back pad 36 configured to receive the back of the seated passenger, and a rear surface disc 38 is fixed onto a rear surface of the seat back pad 36. The rear surface disc 38 is placed at a position which is located at the center of the seat back pad 36 in the lateral direction and is situated higher than the center of the seat back pad 36 in a vertical direction. The tension wires 34A and 34B are hooked on the rear surface disc 38 and tensioned, to thereby place the rear surface disc 38 into position. Each of the tension wires 34A is formed in the shape of a loop and is looped around three points consisting of two points spaced from each other in the vertical direction on the seat back support frame 20 and one point in the rear surface disc 38. The tension wires 34A are configured to place the rear surface disc 38 into position mainly with respect to the lateral direction and the vertical direction. Each of the tension wires 34B is also formed in the shape of a loop and is looped around three points consisting of one point on the seat back support frame 20, one point in the rear surface disc 38, and one point on a lower end portion of the headrest stay 32. The tension wires 34B are configured to place the rear surface disc 38 into position mainly with respect to the lateral direction and the front and back direction. The tension wires 34A and 34B extend radially from the rear surface disc 38 toward the seat back support frame 20.

The seat back 16 further includes a seat back sub frame 42 which is suspended from the rear surface disc 38 by suspension wires 40. The seat back sub frame 42 is fixed to the rear surface of the seat back pad 36. The suspension wires 40 are arranged on the right and left sides, one on each side, and both ends of the suspension wires 40 are joined to the seat back sub frame 42 while middle portions of the suspension wires 40 are hooked in the rear surface disc 38. The seat back sub frame 42 is suspended from the seat back support frame 20 via the rear surface disc 38 by the tension wires 34A, 34B and the suspension wires 40, and accordingly supported by the seat back support frame 20.

As described above, because the rear surface disc 38 is placed into position by the extension wires 34A, 34B and the seat back sub frame 42 is suspended from the rear surface disc 38, the seat back 16 is able to swing like a pendulum about an axis extending along the front and back direction and taking the rear surface disc 38 as the center. The axis constituting the swing center of the seat back 16 passes through the chest of the seated passenger.

The seat back sub frame 42 includes a pair of sub frame vertical members 44, which extend substantially along the vertical direction on both right and left sides of the vehicle seat 10, and two sub frame lateral members 46U and 46L, which are arranged substantially along the lateral direction to connect the sub frame vertical members 44 on the right and left sides. One of the two sub frame lateral members 46; i.e., the sub frame lateral member 46U located upward, is joined to the pair of sub frame vertical members 44 at positions slightly above the vertical center of each sub frame vertical member 44. The other of the two sub frame lateral members 46; i.e., the sub frame lateral member 46L located downward, is joined to the pair of sub frame vertical members 44 at lower ends thereof. The seat back sub frame 42 is urged toward a neutral position by a force exerted from return springs (not illustrated) disposed between the seat frame 12 and the sub frame lateral members 46U and 46L. The neutral position is a position at which the seat back sub frame 42 is suspended vertically downward from the rear surface disc 38. The seat back 16 is always returned to the neutral position by a gravitational force and an elastic force of the return springs after the seat back 16 is swung and displaced from the neutral position. The return spring may be a plate spring which is long in the front and back direction and placed along the front and back direction, and the plate spring is configured to be flexed in response to a swing of the seat back 16 in the lateral direction, to thereby produce the spring force for returning the seat back 16 to the neutral position. The plate spring, which exhibits almost no flection in the front and back direction, can contribute to positioning of the seat back 16 relative to the seat back 16 in the front and back direction.

A plurality of bridge wires 48 are hung between the sub frame vertical members 44 on the right and left sides of the seat back sub frame 42. The bridge wires 48 are configured to support the seat back pad 36 from behind the seat back pad 36 for receiving a load from a passenger.

The seat cushion support frame 18 includes a pair of side plates 50 which are disposed on right and left sides of the seat cushion 14 and extend along the front and back direction, and two connection bars 52 which connect the side plates 50 on the right and left sides. The two connection bars 52 are disposed on front and rear end portions of the side plates 50, respectively. FIG. 1 shows only the one of the connection bars 52 that is located forward.

The seat cushion 14 includes a cushion pan 54 which is movably supported by the seat cushion support frame 18, and a cushion pad 56 which is attached onto the cushion pan 54. The cushion pan 54 is supported on the seat cushion support frame 18 by support mechanisms disposed on front and rear regions of the cushion pan 54. A front-side support mechanism 58 includes a bracket 60 which is fixed to the connection bar 52 located forward, a bearing 62 which is fixed to the bracket 60, and an axle 64 which is fixed to the cushion pan 54. The axle 64 is rotatably supported by the bearing 62, and the cushion pan 54 is able to swing about an axis A of the axle 64. The axis A passes through a lumbar part of the seated passenger and is inclined to become lower on the front side. The support mechanism located rearward, which is not shown in FIG. 1, may include, for example, arc-shaped guide rails fixed to the cushion pan 54, and a roller fixed to the seat cushion support frame 18. When the cushion pan 54 is swung about the above-described swing axis A, the guide rails maintain their positions being supported by the roller, which allows the support mechanism located rearward to continuously support the cushion pan 54 on a rear end portion thereof.

Figure 2:
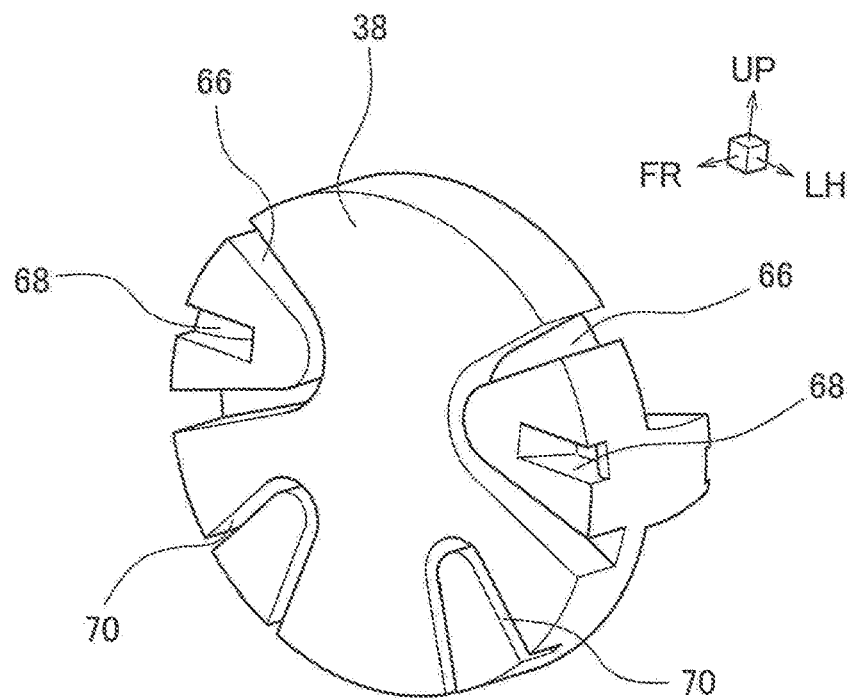
FIG. 2 is a perspective view showing a rear surface disc.

FIG. 2 is a perspective view showing the rear surface disc 38. The rear surface disc 38 includes wire passages 66, 68, and 70 into which the tension wires 34A, 34B and the suspension wires 40 are inserted. Two wire passages 66, one on the right side and one on the left side, are formed corresponding to the extension wires 34A of the right and left sides. The wire passage 66 is formed in the shape of the letter V with its point being rounded in a plane substantially orthogonal to the front and back direction. Further, two wire passages 68, one on the right side and one on the left side, are formed corresponding to the extension wires 34B of the right and left sides. The wire passage 68 is formed in the shape of the letter V with its point being rounded in a plane substantially orthogonal to the vertical direction. In addition, right and left wire passages 70 are formed corresponding to the suspension wires 40 of the right and left sides. The wire passage 70 is formed in the shape of the letter V with its point being rounded in the plane orthogonal to the front and back direction.

Figure 3:
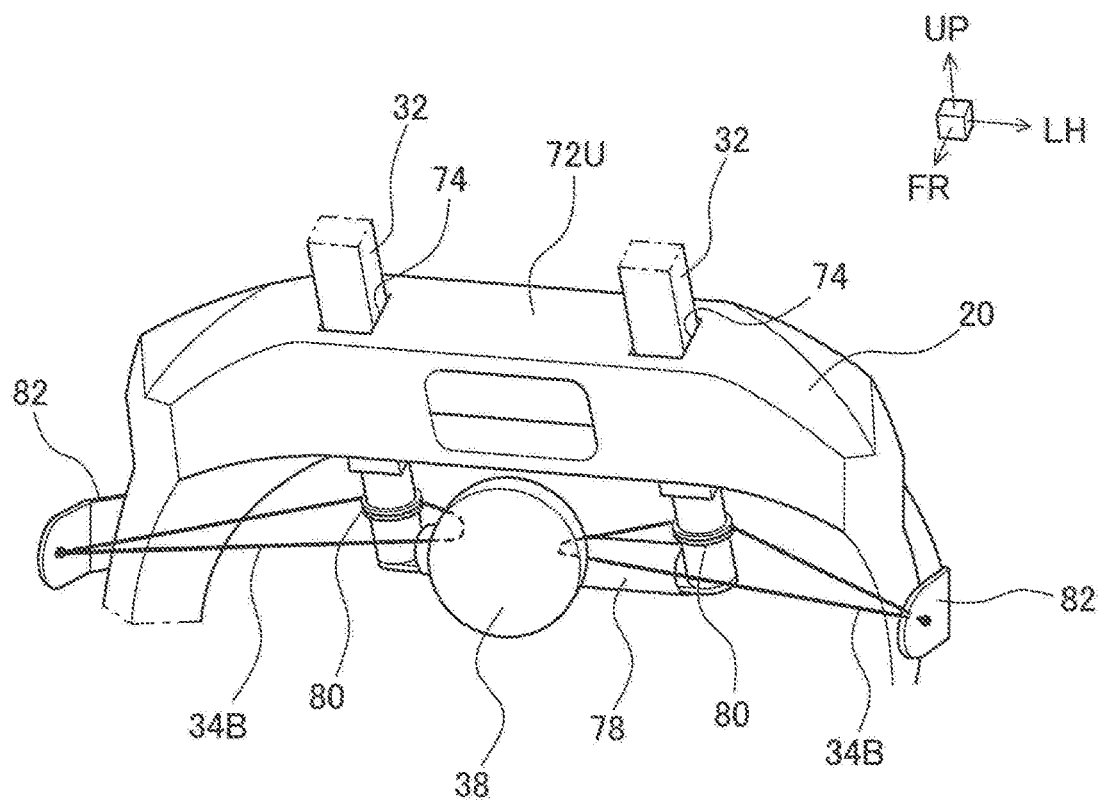
FIG. 3 is a perspective view showing an upper portion of the vehicle seat when viewed downward from obliquely forward.
Figure 4:
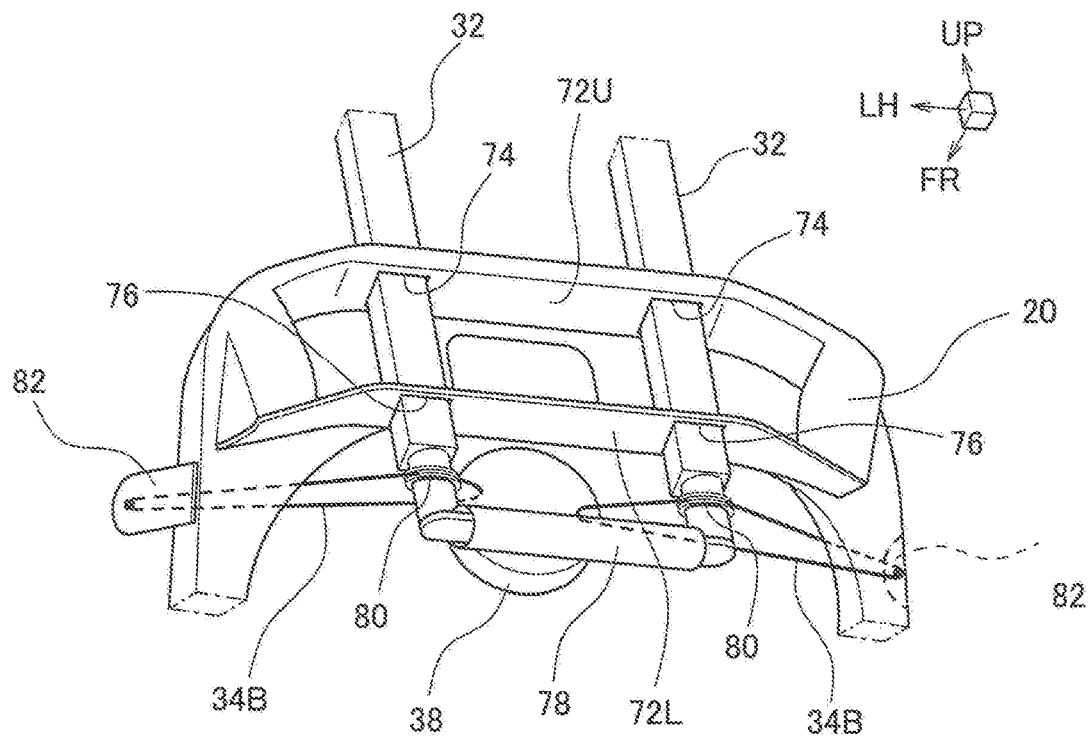
FIG. 4 is a perspective view showing the upper portion of the vehicle seat when viewed upward from obliquely rearward.

FIGS. 3 and 4 are perspective views showing the arrangement for supporting the headrest 28. FIG. 3 shows an upper portion of the seat back support frame 20 as viewed downward from obliquely forward, and FIG. 4 shows the upper portion as viewed upward from obliquely rearward. Two plate shaped lateral members 72 extending along the lateral direction are disposed on the upper portion of the seat back support frame 20. The one of the lateral members 72 that is disposed upward is referred to as an upper lateral member 72U, and the other of the lateral members 72 that is disposed downward is referred to as a lower lateral member 72L. The upper and lower lateral members 72U and 72L may be formed integrally with the seat back support frame 20, or may be formed as separate members and subsequently joined to the seat back support frame 20. Two guide slots 74 which extend in the front and back direction are formed in the upper lateral member 72U, while guide slots 76 which are also extend in the front and back direction are formed in the lower lateral member 72L. Each of the two headrest stays 32 is inserted through both the guide slot 74 and guide slot 76, and has a lower end projected downward from the lower lateral member 72L. In addition, lower ends of the headrest stays 32 on the right and left sides are coupled to each other by a stay coupling bar 78.

A catch groove 80 in which the extension wire 34B is hooked is disposed on a lower end portion of the headrest stay 32. The rear surface disc 38 includes the wire passages 68 (see FIG. 2) for receiving the extension wires 34B, and the seat back support frame 20 includes, at positions corresponding to the shoulders of the seated passenger, shoulder brackets 82 in which the extension wires 34B are hooked. Each of the extension wires 34B in the shape of a loop is looped around three positions of the shoulder bracket 82 in the seat back support frame 20, the wire passage 68 in the rear surface disc 38, and the catch groove 80 in the headrest stay 32. Tensions of the two extension wires 34B act on the lower end portions of the headrest stays 32 as a forward force.

Figure 5:
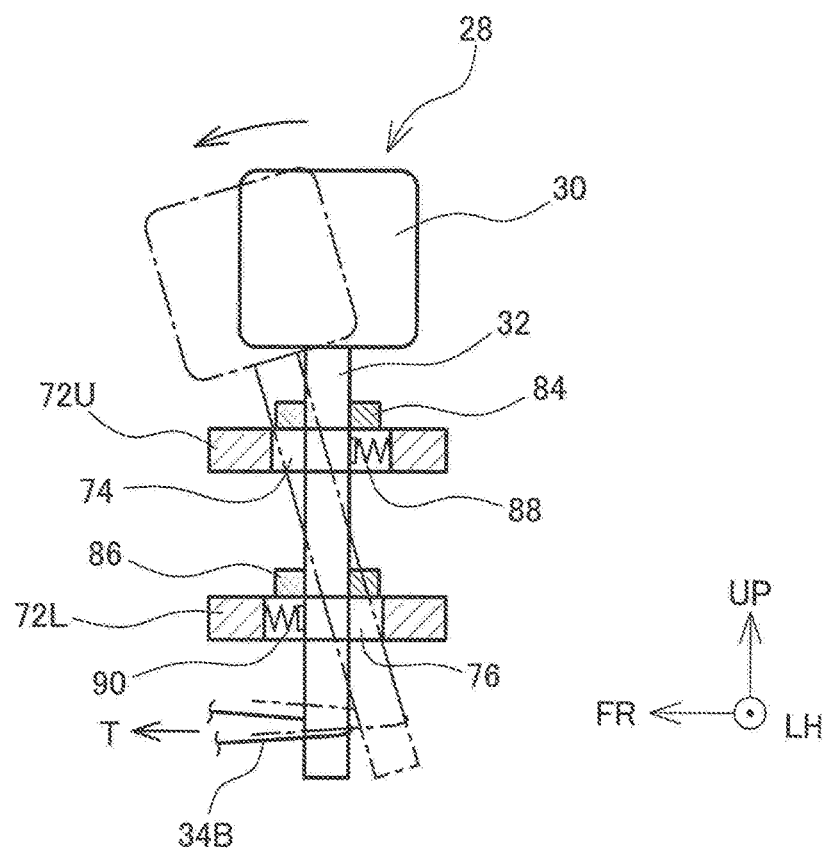
FIG. 5 is a cross section view showing an arrangement for supporting a headrest.
Figure 6:
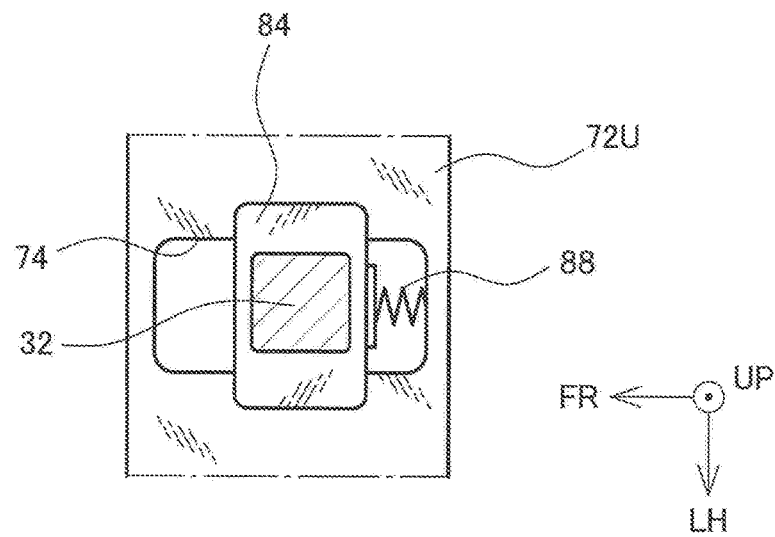
FIG. 6 is a plan view showing the arrangement for supporting the headrest.

FIG. 5 is a cross section view schematically showing the arrangement for supporting the headrest 28. The cross section view shows a cross section in a plane passing through the guide slots 74 and 76 and orthogonal to the lateral direction. The headrest stay 32 extends through the guide slots 74 and 76 and projects downward from the lower lateral member 72L. The lower end portion of the headrest stay 32 receives the extension wire 34B which is looped over the headrest stay 32. The headrest stay 32 is equipped with hitch flanges 84 and 86 which are formed so as to project from the guide slots 74 and 76 in the lateral direction, respectively. As shown in FIG. 6, a lateral dimension of the hitch flange 84 is greater than a lateral dimension of the guide slot 74, which allows both lateral ends of the hitch flange 84 to rest on an edge region around the guide slot 74, so that the hitch flange 84 is placed over the guide slot 74 without dropping off. Similarly, the hitch flange 86 also has both ends resting on an edge region around the guide slot 76, and is thus placed over the guide slot 76 without dropping off.

In the guide slot 74 of the upper lateral member 72U, a spring 88 is placed between the headrest stay 32 and a rear end of the guide slot 74 to urge the headrest stay 32 forward. In the guide slot 76 of the lower lateral member 72L, a spring 90 is placed between the headrest stay 32 and a forward end of the guide slot 76 to urge the headrest stay 32 rearward. Urging forces of the spring 88 and the spring 90 function as a couple of forces for causing the headrest 28 to tilt forward, and the springs 88 and 90 function as elastic elements for urging the headrest 28 to be tilted forward. Hereinafter, the springs 88, 90 are referred to as tilt springs 88, 90. It should be noted that the elastic elements for causing the headrest 28 to be tilted are not limited to those placed within the guide slots 74 and 76, and they may be placed in other locations.

Figure 7:
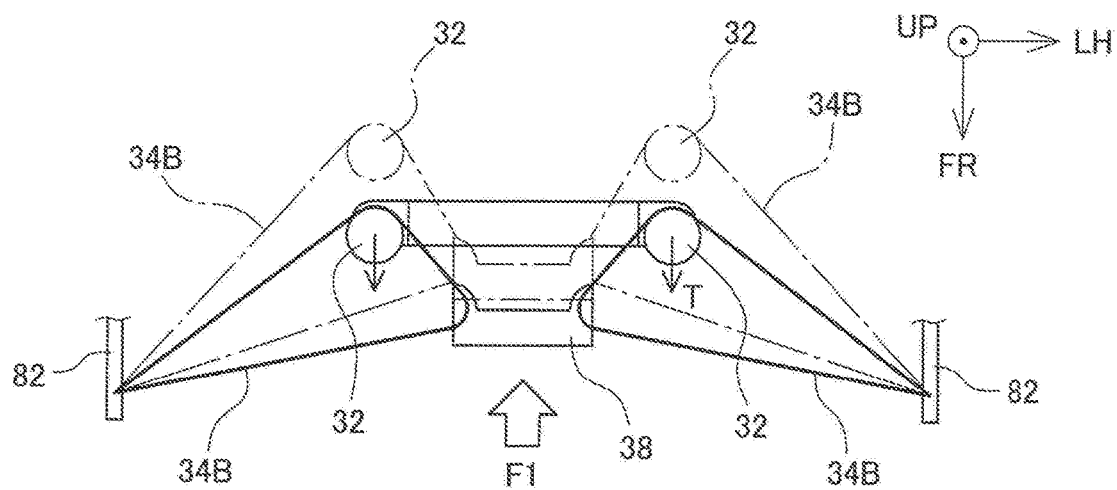
FIG. 7 is a diagram showing motions of the rear surface disc and head rest stays caused by a rear-end collision.

FIG. 7 is a schematic diagram showing a plan view of the arrangement for supporting the headrest 28. The extension wires 34B are looped over the shoulder brackets 82 through the rear surface disc 38, and over the headrest stays 32. During normal operation, tensions T of the tension wires 34B act on the headrest stays 32, and therefore cause the headrest 28 to be erected against the urging forces of the tilt springs 88 and 90. FIGS. 5 and 7 show a state of the arrangement during the normal operation with solid lines. In the state of normal operation, the headrest stays 32 are located at a rear end of a movable range within the guide slots 74 and are located at a front end of the movable range within the guide slots 76.

In a rear-end collision, an inertial force acting on the seated passenger pushes the seat back 16 toward the rear, and a collision load F1 is applied to the rear surface disc 38 (see FIG. 7). As a result, the rear surface disc 38 is retreated to a position indicated by a dotted chain line in FIG. 7, which causes tensions T of the tension wires 34B to be loosened. When the tensions T are loosened, the headrest 28 is tilted forward by the urging forces of the tilt springs 88 and 90. In the rear-end collision, the headrest 28 is also subjected to an inertial force acting rearward, and the inertial force acts on the headrest 28 in a direction that the headrest 28 is tilted rearward. The elastic forces of the tilt springs 88 and 90, a distance between the upper lateral member 72U and the lower lateral member 72L, a position of the center of gravity of the headrest 28, and other conditions are appropriately selected to establish a condition such that a moment which causes the headrest 28 to be tilted forward becomes greater than a moment resulting from the inertial force which causes the headrest 28 to be tilted rearward. After the collision load F1 has dissipated, the rear surface disc 38 is returned to its normal position, while the headrest 28 is returned to its erected position.

In the guide slots 74 and 76, elastic members, such as rubber elastic members, may be disposed on end faces of the guide slots 74 and 76 contacted by the headrest stays 32 when the headrest stays 32 are tilted forward. A tilting speed of the headrest 28 can be changed by adjusting a spring constant of the elastic members, or a hardness of the rubber elastic members when made of rubber.

Figure 8:
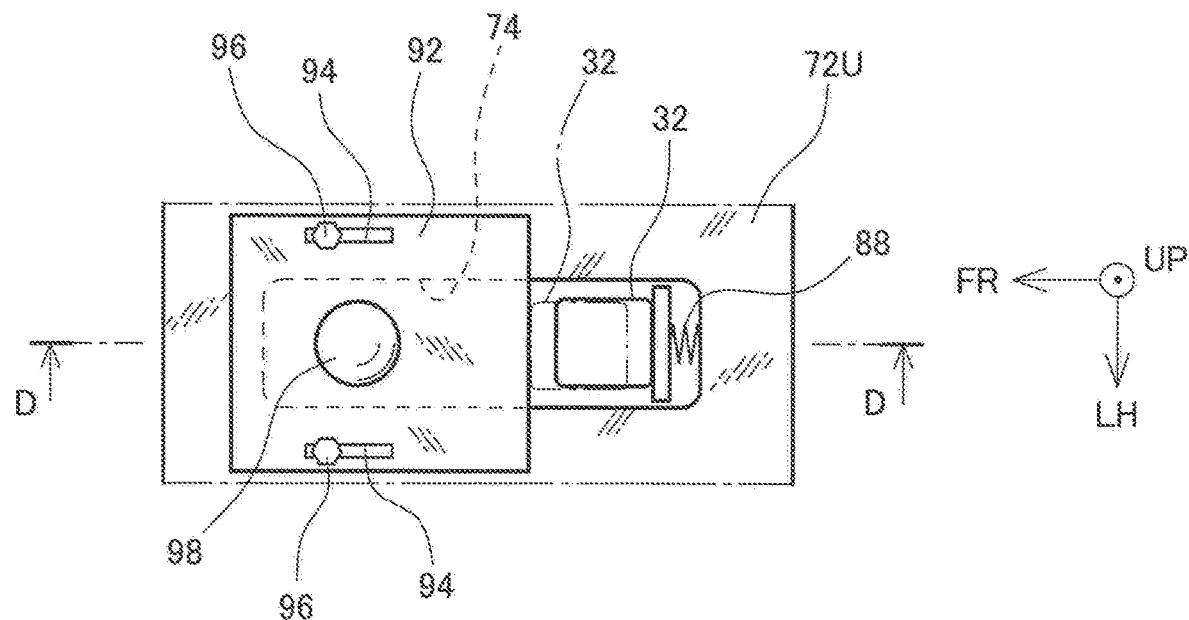
FIG. 8 is a plan view showing a mechanism for adjusting a movable range of the headrest in a state where the movable range is narrowed.
Figure 9:
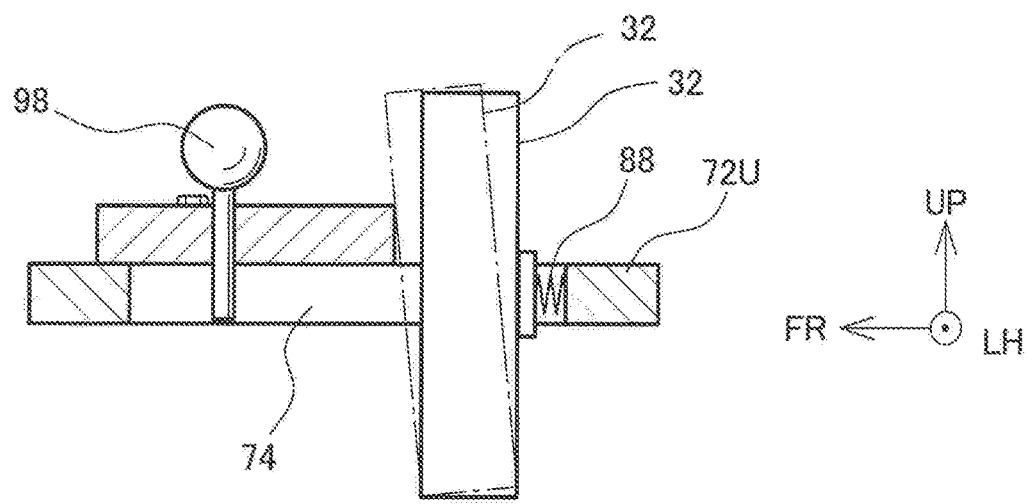
FIG. 9 is a cross section view showing the mechanism for adjusting the movable range of the headrest in the state where the movable range is narrowed.
Figure 10:
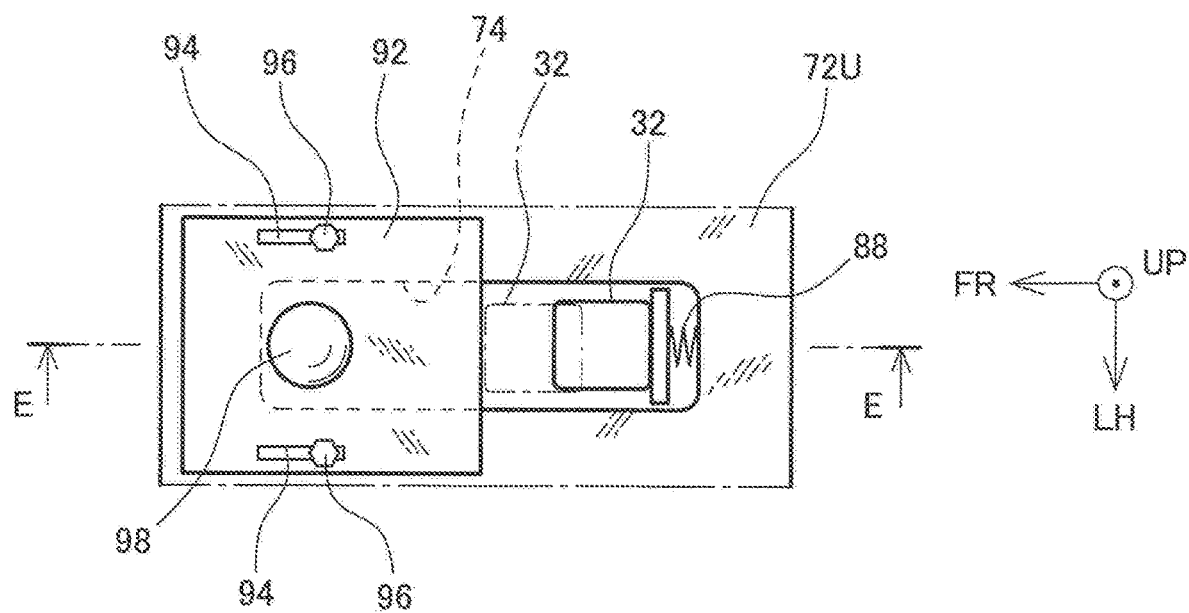
FIG. 10 is a plan view showing the mechanism for adjusting the movable range of the headrest in a state where the movable range is broadened.
Figure 11:
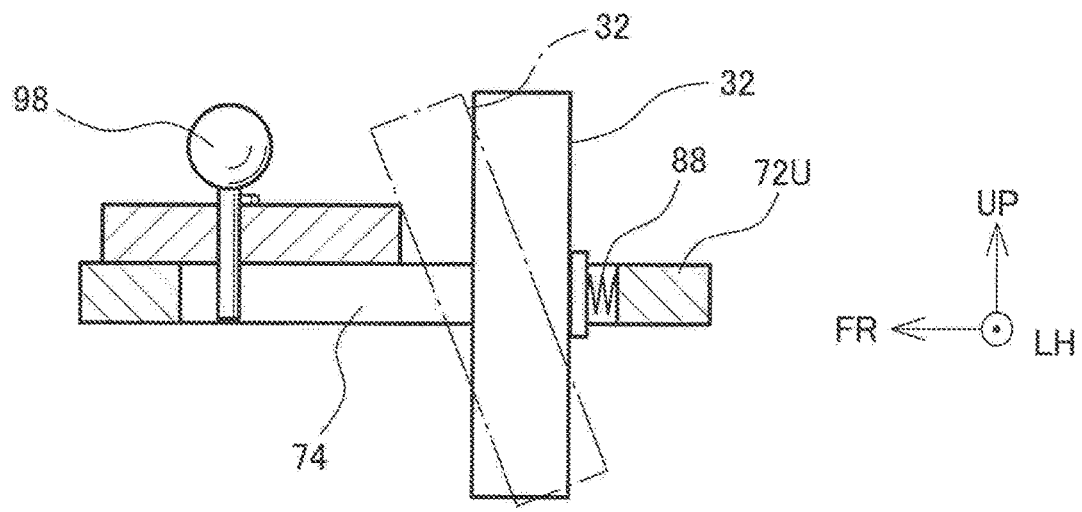
FIG. 11 a cross section view showing the mechanism for adjusting the movable range of the headrest in the state where the movable range is broadened.

FIGS. 8 to 11 are diagrams showing a principal part of a headrest supporting arrangement in which a tiltable range of the headrest 28 can be changed. FIGS. 8 and 10 show a plan view of the principal part, FIG. 9 shows a cross section view taken along a line D-D indicated in FIG. 8, and FIG. 11 shows a cross section view taken along a line E-E indicated in FIG. 10.

The guide slot 74 in the upper lateral member 72U is equipped with a limiter plate 92. The limiter plate 92 is disposed on a top surface of the upper lateral member 72U to cover a part of the guide slot 74. The limiter plate 92 has limiter plate slits 94 elongated in the front and back direction, to receive bolts 96 inserted through the limiter plate slits 94. The bolts 96 are screwed into threaded holes defined in the upper lateral member 72U and fixed in an erected position onto the top surface of the upper lateral member 72. When the bolts 96 are loosely engaged with the limiter slits 94, the limiter plate 92 is slidable along the front and back direction, while the limiter plate 92 can be secured by tightening the bolts 96. The limiter plate 92 is equipped with a knob 98 which can be grabbed for operation. Therefore, the limiter plate 92 can be easily slid by grabbing and operating the knob 98.

FIGS. 8 and 9 show a state where the limiter plate 92 is slid rearward to narrow the movable range of the headrest stay 32 within the guide slot 74, and FIGS. 10 and 11 show a state where the limiter plate 92 is slid forward to broaden the movable range of the headrest stay 32. As shown in FIGS. 8 to 11, when the movable range of the headrest stay 32 is narrowed, a tilting angle of the headrest stay 32 being tilted forward becomes smaller, whereas when the movable range is broadened, the tilting angle becomes greater. Accordingly, the headrest main body 30 can be set, by adjusting the tilting angle, in a position where the headrest main body 30 fits to the physique of the seated passenger in a rear-end collision. The limiter plate may be provided to the lower lateral member 72L rather than to the upper lateral member 72U, and may be disposed on both of the upper and lower lateral members 72U and 72L.

Figure 12:
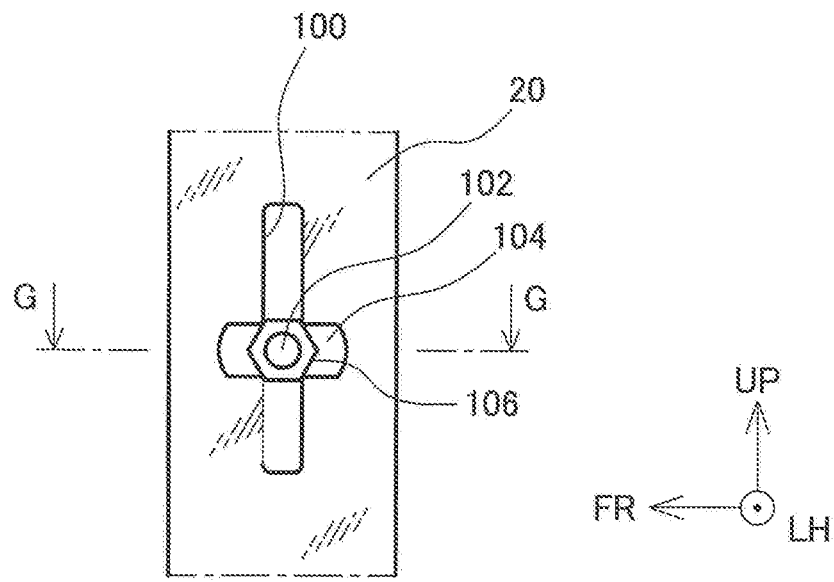
FIG. 12 is a side view showing a mechanism for adjusting a height at which a lower lateral member is placed.
Figure 13:
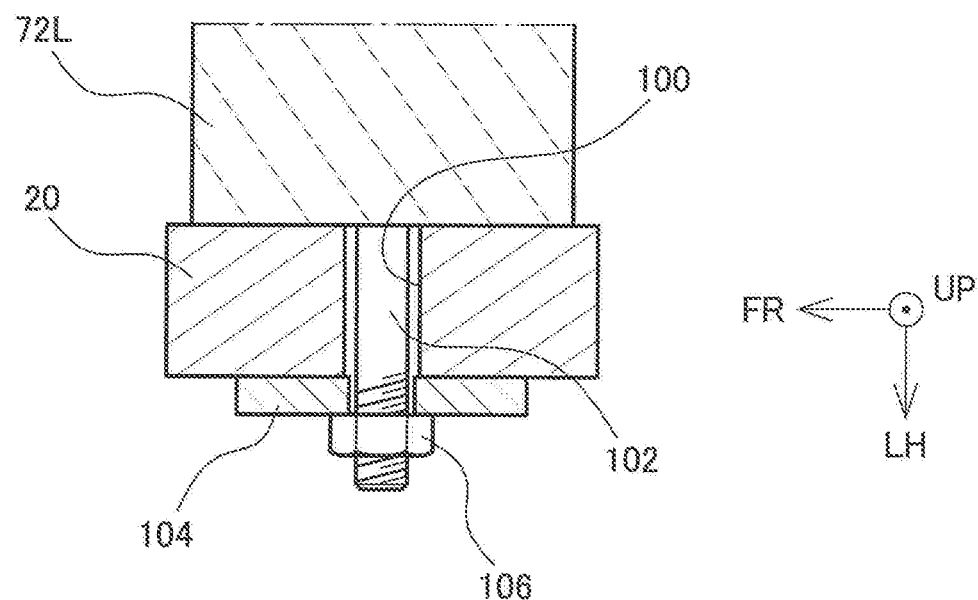
FIG. 13 is a cross section view showing the mechanism for adjusting the height at which the lower lateral member is placed.

FIGS. 12 and 13 are schematic diagrams showing a principle part of a headrest supporting arrangement, in which a height of the lower lateral member 72L to be placed can be changed. FIGS. 12 and 13 show only a left end region of the lower lateral member 72L and components in the left end region. The arrangement in a right end region of the lower lateral member 72L is formed symmetrically with that in the left end region. A frame slit 100 is defined substantially along the vertical direction in a component of the seat back support frame 20, the component extending substantially vertically. A screw shaft 102 whose tip end is threaded is formed on each end of the lower lateral member 72L so as to project leftward from the lower lateral member 72L. The screw shaft 102 is inserted through the frame slit 100 and also through a nip plate 104 which is arranged on the side of the seat back support frame 20 that is opposite to the lower lateral member 72L. A nut 106 is screwed onto the screw shaft 102, and when the nut 106 is tightened, the nip plate 104 and the lower lateral member 72L cooperate to hold the seat back support frame 20 therebetween, so that the lower lateral member 72L is fixed to the seat back support frame 20. The lower lateral member 72L can be secured at any position within the frame slit 100. In this way, an installation height of the lower lateral member 72L is configured to be changeable. The structure for changing the installation height may be provided for the upper lateral member 72U rather than the lower lateral member 72L, and may be provided for both of the upper and lower lateral members 72U and 72L.

In the above-described embodiment, the vehicle seat 10 has been explained with the seat back 16 configured to be swingable like a pendulum about the rear surface disc 38. However, the present disclosure is not limited to the above embodiment, and the above-described mechanism for tilting the headrest may be applied to a vehicle seat having a seat back fixed to a seat frame. For example, the rear surface disc may be disposed on a rear surface of a seat back pad in the seat back fixed to the seat frame, and each of the tension wires arranged under tension between the rear surface disc and the seat frame is also hooked on a headrest. One end of the tension wire may be connected to the seat frame, the other end of the tension wire may be connected to the rear surface disc, and a middle portion of the tension wire may be hooked on the headrest. The headrest is urged to be tilted forward by the elastic element. However, in normal operation, the tension of the tension wire holds the headrest in the erected position against the urging force of the elastic element, and when the tensile force is loosened in response to a retreat of the rear surface disc in a rear-end collision, the urging force of the elastic member causes the headrest to be tilted forward.

Other forms of the vehicle seat according to this disclosure will be described below.

(1) In one form, the vehicle seat may include a seat frame, and a seat back which is supported by the seat frame through a plurality of tension wires hung under tension from the seat frame, and has, on a rear surface, a rear surface disc in which the plurality of tension wires are hooked. The vehicle seat may further include a headrest which is disposed on the seat frame and configured to be tiltable toward the front, and an elastic element which is configured to urge the headrest to be tilted forward. In the vehicle seat, some of the plurality of tension wires are hooked on the headrest to apply a tension to the headrest, the tension maintaining the headrest at an erected position against an urging force of the elastic element during normal operation, which is loosened in a rear-end collision in response to a retreat of the rear surface disc, to thereby cause the headrest to be tilted forward.

(2) In another form, the vehicle seat may include a seat frame, a seat back having a rear surface disc arranged on a rear surface of the seat back, a pair of right and left tension wires arranged under tension between the seat frame and the rear surface disc, a headrest disposed on the seat frame and configured to be tiltable toward the front, and an elastic element configured to urge the headrest to be tilted forward. In the vehicle seat, the pair of right and left tension wires are hooked on the headrest to apply a tension to the headrest, the tension maintaining the headrest at an erected position against an urging force of the elastic element during normal operation, which is loosened in a rear-end collision in response to a retreat of the rear surface disc, to thereby cause the headrest to be tilted forward.

The invention claimed is:

1. A vehicle seat, comprising:
a seat frame;
a seat back having a rear surface disc disposed on a rear surface of the seat back;
a plurality of tension wires arranged under a tension between the seat frame and the rear surface disc;
a headrest disposed on the seat frame and configured to be tiltable toward a front side; and
an elastic element configured to urge the headrest to be tilted forward, wherein
one or more tension wires of the plurality of tension wires are hooked on the headrest to apply a tension to the headrest, the tension maintaining the headrest at an erected position against an urging force of the elastic element during normal operation, and loosening in response to a retreat of the rear surface disc.

2. The vehicle seat according to claim 1, wherein:
the headrest includes a headrest main body which is configured to receive the head of a seated passenger, and a pair of headrest stays which extend downward from the headrest main body and have lower end portions on which the one or more extension wires are hooked;
the seat frame includes an upper lateral member and a lower lateral member which are disposed on an upper portion of the seat frame so as to be spaced from each other in a vertical direction, and extend along a lateral direction; and
each of the upper lateral member and the lower lateral member includes a pair of guide slots which are long in a front and back direction to guide, along the front and back direction, the pair of headrest stays respectively inserted through the pair of guide slots.

3. The vehicle seat according to claim 2, wherein
the pair of guide slots defined in at least one of the upper lateral member and the lower lateral member have a length that is adjustable in the front and back direction.

4. The vehicle seat according to claim 2, wherein
the elastic element is arranged in each of spaces between the upper lateral member and the pair of headrest stays and between the lower lateral member and the pair of headrest stays, and an installation height of at least one of the upper lateral member and the lower lateral member is configured to be adjustable.

5. The vehicle seat according to claim 1, wherein
the seat back is supported on the seat frame through the plurality of tension wires in a state swingable about the rear surface disc.

* * * * *